UNITED STATES PATENT OFFICE.

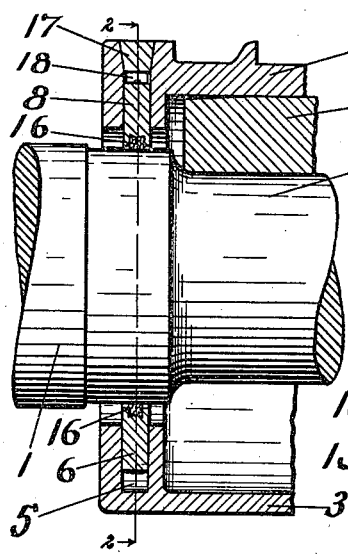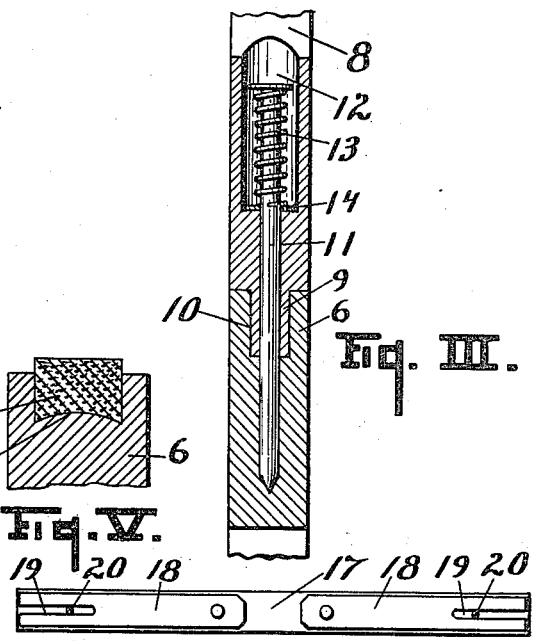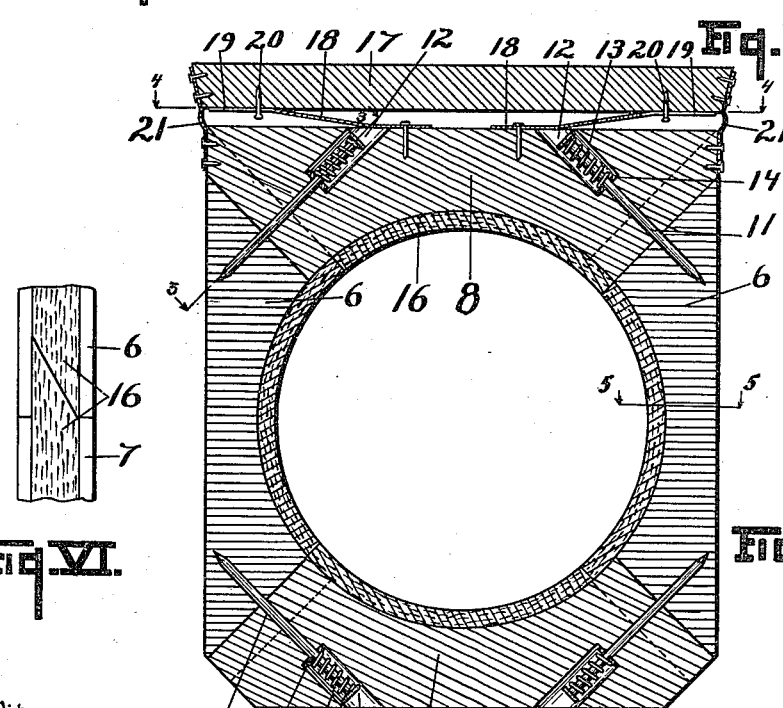

HENRY L. HASKELL, OF LUDINGTON, MICHIGAN.

DUST-GUARD FOR CAR JOURNAL-BOXES.

1,153,551.  Specification of Letters Patent.  Patented Sept. 14, 1915.

Application filed January 8, 1913. Serial No. 740,833.

*To all whom it may concern:*

Be it known that I, HENRY L. HASKELL, a citizen of the United States, residing at Ludington, Michigan, have invented certain new and useful Improvements in Dust-Guards for Car Journal-Boxes, of which the following is a specification.

This invention relates to improvements in dust guards for car journal boxes.

The main objects of this invention are: First, to provide an improved dust guard for car journal boxes which is free to expand uniformly. Second, to provide an improved dust guard which is simple in its parts and the parts are easily assembled. Third, to provide in a dust guard an improved seat closure.

Further objects, and objects relating to structural details, will definitely appear from the detailed description to follow.

I accomplish the objects of my invention by the devices and means described in the following specification.

The invention is clearly defined and pointed out in the claims.

A structure which is a preferred embodiment of my invention is clearly illustrated in the accompanying drawing, forming a part of this specification, in which:

Figure I is a detail longitudinal section through an axle box having my improved dust guard therein, the axle and its journal being shown in full lines. Fig. II is a vertical section through my improved dust guard taken on a line corresponding to line 2—2 of Fig. I. Fig. III is an enlarged detail section on a line corresponding to line 3—3 of Fig. II, showing the arrangement of the joint or dowel pin 11. Fig. IV is a horizontal section on a line corresponding to line 4—4 of Fig. II. Fig. V is an enlarged detail section on a line corresponding to line 5—5 of Fig. II, showing the shape of the joint groove. Fig. VI is a detail view showing the beveled lapped joint of the gasket sections.

In the drawings, similar numerals of reference refer to similar parts throughout the several views, and the sectional views are taken looking in the direction of the little arrows at the ends of the section lines.

Referring to the drawing, 1 represents a railway car axle having a journal 2. The journal box 3 is of the usual or any desired construction and is provided with a journal bearing 4. The box is provided with a slot-like seat 5 adapted to receive the dust guard.

My improved dust guard is formed of segmental sections or members, the structure illustrated consisting of 6, 6, 7 and 8, the sections or members 6, 6, being the side members, and the section 7 the bottom and the section 8 the top. These members are joined by radial tongue and groove joints, the tongues being on the top and bottom members, while the grooves 10 are in the side members.

The dowel or joint pins 11 are arranged at right angles to the planes of the joints. These dowel or joint pins are arranged in countersunk holes 12 in one member to engage the adjacent member. In the structure shown, nails are used for the dowel pins. The springs 13 are arranged on the dowel pins to engage the heads thereof, the washers 14 being arranged in the bottom of the countersinks to form rests for the inner ends of the springs. This provides a connection which permits the guard to expand uniformly in four directions.

The guard sections are provided with grooves 15 for the sectional gasket 16. The gasket sections are provided with beveled joints, as clearly appears in Fig. VI, so that the gasket remains continuous, even when the dust guard is expanded. The bottom of the groove 15 is preferably curved outwardly in cross section, so that the gasket bears at its center.

The closure member 17 is wedge-shaped to fit into the dust guard slot 5, and is mounted on the top guard member 8 by means of the blade springs 18, there being a pair of these springs, the springs being slotted at 19 to receive the pins 20 on the closure member. Straps 21 connect the ends of the closure member with the top guard member.

By this arrangement of the parts, I secure a dust guard which is simple in its parts, permitting the use of relatively small pieces in its manufacture, and one which, when assembled, is durable and not likely to get out of repair. The pieces may be cut with the grain of the wood so that they are not likely to split or check. The guard expands uniformly and readily conforms itself to the axle.

I have not attempted to illustrate or describe various modifications which I contemplate, as such modifications will be readily understood by those skilled in the art to which this invention relates from the disclosure made.

Having thus described my invention, what I claim as new and desire to secure by Letters Patent is:

1. A dust guard comprising four segmental guard members having radial tongue and groove joints, the tongues being on the top and bottom members and the grooves in the side members; joint pins arranged in countersunk holes in the top and bottom guard members to engage the said members, said pins being arranged at right angles to the planes of the joints; a wedge shaped closure member; longitudinally slotted blade springs mounted on the top guard member; pins on said closure member engaging said slots; and straps connecting the ends of said closure member to said guard member.

2. A dust guard comprising segmental guard members having radial tongue and groove joints; joint pins connecting adjacent members, said joint pins being arranged at right angles to the planes of the joints, at least one of each pair joined being in sliding engagement with the pin; springs arranged on said pins; a closure member; longitudinally slotted springs mounted on one of said guard members; pins on said closure member engaging said slot; and straps connecting the ends of said closure member with the said guard member.

3. A dust guard comprising four segmental guard members having radial interlocking tongue and groove joints, the tongues being on the top and bottom members and the grooves in the side members, said guard members being provided with gasket grooves in their inner edges; headed pins arranged in countersunk holes in the top and bottom guard members to engage the side members, said pins being arranged at right angles to the planes of the joints; springs arranged on said pins to engage the heads thereof; and a sectional gasket arranged in the grooves of said guard members, the gasket sections being provided with beveled joints.

4. A dust guard comprising four substantially equal complementary segmental members having radially disposed interlocking tongue and groove joints, the tongues being on one opposed pair of members and the grooves on the other opposed pair, said members being grooved on their inner edges to provide a gasket seat, pins arranged at right angles to the planes of the joints in counter sunk holes in the tongued guard members to extend through the tongues and driven into the bottoms of the grooves of the other pair of guard members, said members being supported against relative movement longitudinally of the joints by said joint pins, springs arranged on said pins in said countersinks, and a gasket sectioned to correspond to the guard members, the sections being provided with beveled lapping joints arranged so that the gasket joints do not coincide with but are near the guard member joints whereby the guard member joints are lapped by the gasket sections.

5. A dust guard comprising four substantially equal complementary segmental members having radially disposed interlocking tongue and groove joints, the tongues being on one opposed pair of members and the grooves on the other opposed pair, pins arranged at right angles to the planes of the joints in counter sunk holes in the tongued guard members to extend through the tongues and driven into the bottoms of the grooves of the other pair of guard members, said members being supported against relative movement longitudinally of the joints by said joint pins, and springs arranged on said pins in said counter sinks.

6. A dust guard comprising substantially equal complementary segmental members having radially disposed interlocking tongue and groove joints, said members being grooved on their inner edges to provide a gasket seat, pins connecting adjacent members and arranged at right angles to the planes of the joints, one member of each pair of members joined being in sliding engagement with the pins, said members being supported against relative movement longitudinally of the joints by said joint pins, and a gasket sectioned to correspond to the guard members, the sections being provided with beveled lapping joints arranged so that the gasket joints do not coincide with but are near the guard member joints whereby the guard member joints are lapped by the gasket sections.

7. A dust guard comprising substantially equal complementary segmental members having radially disposed interlocking tongue and groove joints, and pins connecting adjacent members and arranged at right angles to the planes of the joints, one member of each pair of members joined being in sliding engagement with the pins, said members being supported against relative movement longitudinally of the joints by said joint pins.

8. A dust guard comprising four substantially equal guard members having interlocking tongue and groove joints, the tongues being in the top and bottom members and grooves in the side members, joint pins arranged in counter sunk holes in said top and bottom guard members and secured to the side members, said pins being arranged at right angles to the planes of the joints and adapted to support said members against relative movement longitudinally of the joints, and springs arranged on said pins whereby the joints are held yieldingly closed.

In witness whereof, I have hereunto set my hand and seal in the presence of two witnesses.

HENRY L. HASKELL. [L. S.]

Witnesses:
FRANK L. JEROME,
GEORGE A. MASTERSON.

Copies of this patent may be obtained for five cents each, by addressing the "Commissioner of Patents, Washington, D. C."